United States Patent [19]
Huntington

[11] 3,841,161
[45] Oct. 15, 1974

[54] OVERHEAD, EXTENSIBLE SAMPLING DEVICE

[75] Inventor: Fred R. Huntington, Salt Lake City, Utah

[73] Assignee: The Galigher Company, Salt Lake City, Utah

[22] Filed: Oct. 13, 1971

[21] Appl. No.: 188,747

[52] U.S. Cl. .............................. 73/424, 73/421 R
[51] Int. Cl. ............................................ G01n 1/08
[58] Field of Search ................ 73/424, 425.2, 421 R

[56] References Cited
UNITED STATES PATENTS

| | | | |
|---|---|---|---|
| 2,682,772 | 7/1954 | Peterson | 73/424 |
| 2,875,615 | 3/1959 | Ulvin | 73/425 |
| 3,217,547 | 11/1965 | Cordell et al. | 73/424 X |
| 3,365,952 | 1/1968 | Wang | 73/425.2 |
| 3,492,875 | 2/1970 | Tonjes | 73/424 |

FOREIGN PATENTS OR APPLICATIONS

219,819  5/1909  Germany .............................. 73/424

Primary Examiner—Richard C. Queisser
Assistant Examiner—Daniel M. Yasich
Attorney, Agent, or Firm—Trask & Britt

[57] ABSTRACT

An overhead, extensible sampling device for taking samples from the surface and sub-surface portions of bulk solid, particulate material is disclosed. The sampling device is located above moving hopper cars, conveyor belt and the like in such fashion that an extensible sampling conveyor can be extended therefrom into contact with the particulate material, extract a sample and retract. The extensible conveyor is conveniently a helical or screw conveyor which is housed in an elongated housing which also contains means for extending and retracting the conveyor. The extension and retraction means is typically a fluid cylinder fixed to the housing. The elongated housing is hinged or pivoted to a support so that the whole unit may swing into position and then rotate up from the sampling position to avoid interfering with movement of the carrier containing the particulate material. The housing unit may be attached to a moveable support which permits the sampling device to travel along with moving material and thereby maintain the extensible conveyor in contact with the particulate material for a period sufficient to obtain a large sample. Furthermore, the unit may move transversely to the flow of particulate material so that the sample may be discharged from the extensible conveyor into a sample collector or receiver located alongside the carrier containing the particulate material.

14 Claims, 9 Drawing Figures

INVENTOR
FRED R. HUNTINGTON
BY
William S. Britt
ATTORNEY

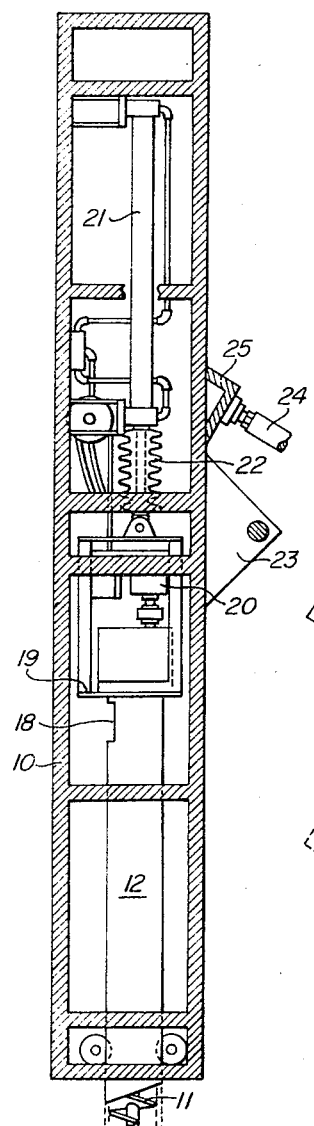
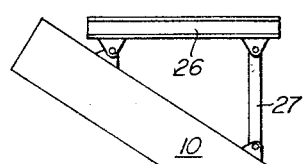
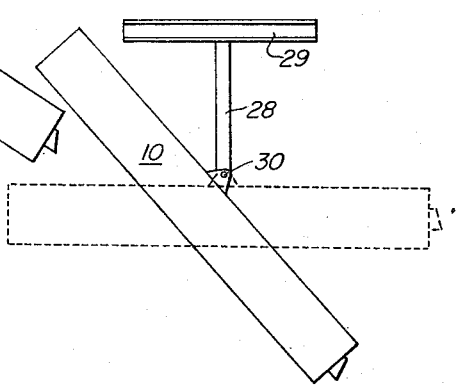
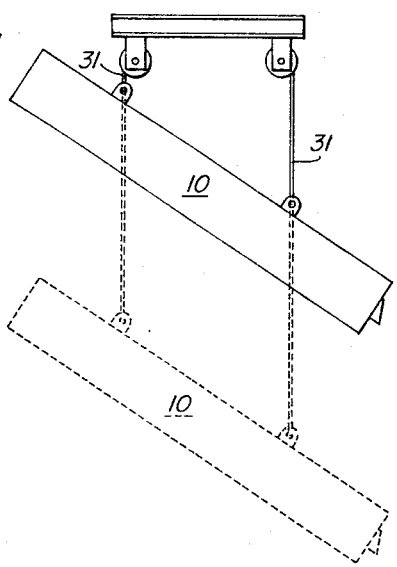
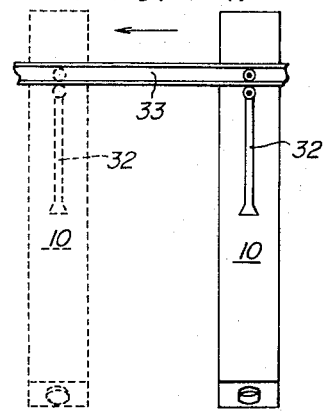
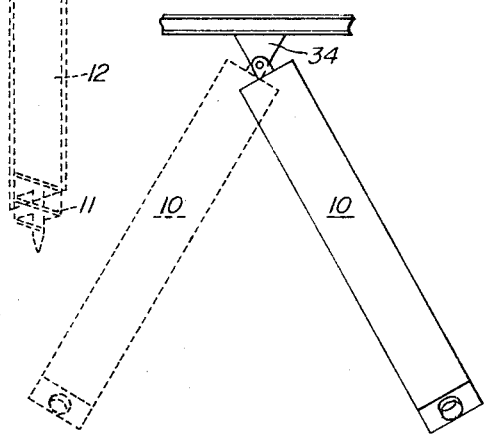
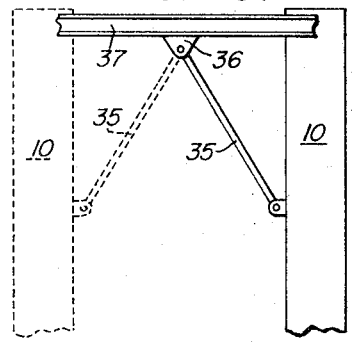
INVENTOR
FRED R. HUNTINGTON
BY William S. Britt
ATTORNEY

OVERHEAD, EXTENSIBLE SAMPLING DEVICE

BACKGROUND OF THE INVENTION

Sampling of solid particulate material has long been practiced. Coal, ores, grains and numerous other solid particulate matrials are sampled prior to consumption or processing. For example, with the current emphasis on abating pollution, coal fed to power plants is regularly checked for sulfur content, and, in other instances, the fuel value (BTU value) is periodically checked since minimum values are frequently specified.

Although samples of solid, particulate materials can be obtained by hand, sampling by means of automated, mechanical samplers is more economical, safer, faster and more efficient, especially when the material to be sampled is moving. Sampling of particulate material in moving hopper cars such as large gondolas presents a difficult sampling problem. The sampling device must have sufficient power to extract a sample and the sample device must not interfere with movement of the hopper car. After extracting a sample, the sampler must convey the sample to a collection station.

OBJECTS OF THE INVENTION

It is an object of this invention to provide a rugged, overhead, extensible sampling device for extracting core samples from the surface portions of solid particulate material, especially moving particulate material.

Another object of this invention is to provide an extensible sampling device which moves along with the moving particulate material to be sampled.

Further objects of this invention include providing a sampling device which during the sampling operation occupies a position near to the material to be sampled and occupies a remote position away from the material to be sampled when the sampling operation is complete and providing a sampling device which transports sampled materials to a remote sample collection station.

DESCRIPTION OF THE INVENTION

An overhead, extensible, sampling device for taking core samples from the surface and subsurface portions of piles of solid, particulate material has been invented. The sampling device is located over the pile of material to be sampled in such a fashion that an extensible sampling conveyor can be extended therefrom into contact with the pile of material, forced into the pile of material and the sample extracted. The extensible conveyor is then retracted and the sampling device is moved to a discharge station where the sample of particulate material is discharged. The extensible sampling means of the sampling device is preferably a helical or screw conveyor comprising a screw and an inner tubular housing (barrel) contained within an outer or main housing which also contains means for extending and retracting the conveyor.

The extension and retraction means is preferably an air or hydraulic cylinder affixed to the main housing. The hydraulic cylinder preferably has enough force to force the tubular housing and screw into a pile of material while the screw is rotated at a speed which causes material in the screw to be transported with a linear velocity which matches substantially the velocity of the screw and tubular housing penetrating into the pile of material to be sampled. In this fashion a core sample is extracted from which particle size distribution within the bulk particulate material can be determined.

The main outer housing is attached to the support so that the whole sampling unit may move into a sampling position and then return to its normal position to await discharge of the sample of material. The main housing may be attached to a movable support which permits the sampling device to move synchronously with a moving pile of material such as a hopper rail car containing particulate material and thereby maintain the extensible conveyor in contact with the particulate material for periods sufficient to obtain a very large sample. Also, the main housing may move in a horizontal direction transversely, preferably at 90°, to the flow of particulate material so that the sample may be discharged from the extensible conveyor into a sample collector receiver located alongside the carrying means containing a particulate material.

Further description of the invention may be facilitated by reference to the accompanying drawings.

FIG. 3 is an elevational, sectional view along section lines 3—3 of FIG. 2 exposing the interior of the main housing.

FIG. 4 illustrates the main housing in a fixed position.

FIG. 5 illustrates the main housing in a suspended, vertically rotatable position.

FIG. 6 illustrates the main housing in a suspended position movable vertically.

FIG. 7 is a plan view illustrating the suspension of the main housing with transverse movement.

FIG. 8 is a plan view illustrating the main housing fixedly attached at one end with the sampling end movable transversely.

FIG. 9 is a plan view illustrating the main housing suspended near its midpoint and movable transversely.

Figure 1:
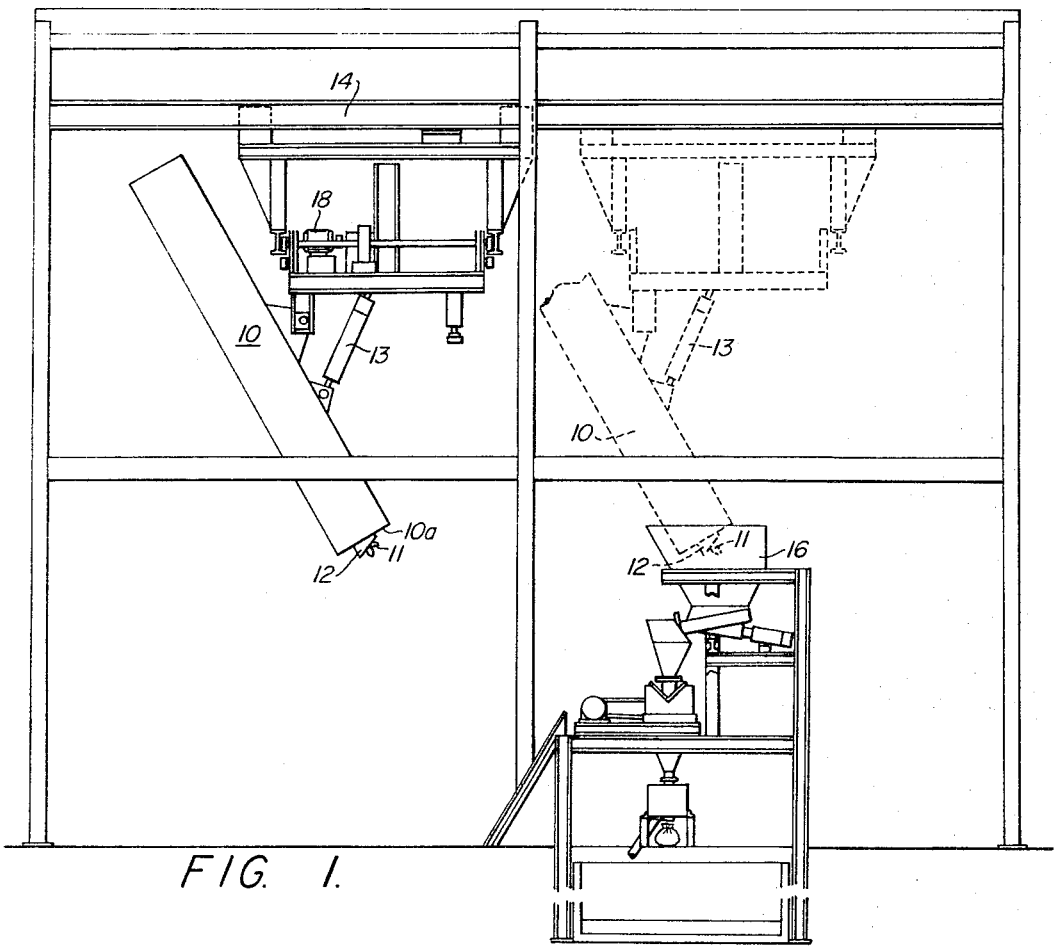
FIG. 1 is an elevational side view illustrating the sampling device in a sampling position and in a discharge position (dotted lines).

In FIG. 1 the sampling device of this invention is illustrated in a sampling position by solid lines and in the discharge position by dotted lines. The main housing 10 is illustrated in a sampling position, that is, the main housing has been moved to an inclined position wherein the screw 11 and the barrel 12 projecting slightly in their retracted position from the lower end of the main housing 10 are in a position to be extended and placed in contact with a pile of particulate material to be sampled. The main housing 10 is lowered into a sampling position by a hydraulic cylinder 13 or other equivalent means for lowering and raising the main housing 10 from a movable carriage which supports the main housing. When the main housing 10 is not in a sampling or discharge position it is rotated to assume a substantially horizontal position. The movable carriage or sub-frame is suspended from rails 14 and is designed to travel along rails 14 in the direction of flow of the particulate material.

The sampling device illustrated in FIG. 1 is particularly adapted for sampling material contained in rail cars passing from left to right in the illustration of FIG. 1. Elongated cylindrical housing 10 is held in a raised position until a rail car passes thereunder. The sampling end 10a of elongated cylindrical housing 10 is then lowered until the sampling end 10a and the screw 11 and barrel 12 are substantially in contact with the material contained in the moving car. The carriage is then moved along rail 14 at a forward speed substantially matching the forward speed of the rail car.

The screw 11 and barrel 12 are extended from housing 10 and forced into the particulate material. The rotational speed of screw 11 and linear velocity of screw enclosure (barrel) 12 are preferably substantially matched so that a particular particle of material in the pile maintains the same relative position with the remainder of the pile until the screw 11 and barrel 12 have been fully extended. The screw may continue to rotate while the barrel 12 is retracted to its rest position within housing 10, however, is is preferred to have the screw cease rotation when barrel 12 is fully extended, which function may be controlled by a limit switch located within the main housing 10 near sampling end 10a which is contacted by a protrusion on barrel 12 when it is fully extended. The housing 10 is then moved to a substantially horizontal position by actuation of hydraulic cylinder 13 to return the housing to a rest position. During the extraction of a sample the carriage (sub-frame) from which housing 10 is suspended moves at a forward speed substantially matching the forward speed of the rail car. The speed of the carriage may be controlled manually or automatically, for example, by a pair of electric eyes determining rail car speed and controlling carriage speed to match it. By the time the sample has been extracted, and the screw 11 and barrel 12 have been retracted into the main housing 10, the carriage and housing 10 have a position substantially shown by the dotted lines of FIG. 1. As indicated, the main housing 10 is returned to its rest position after the sample has been extracted.

Figure 2:
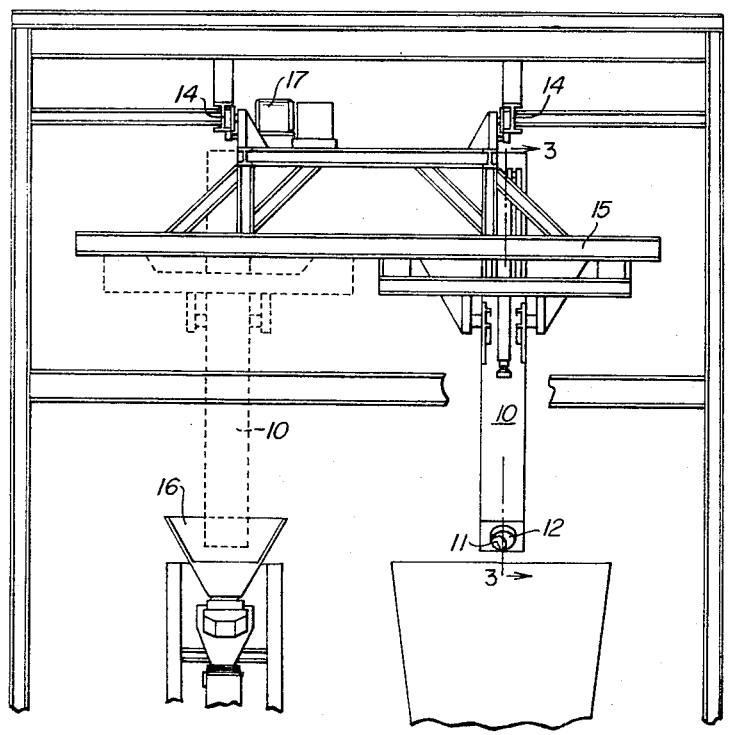
FIG. 2 is an elevational end view illustrating the sampling position and discharge position of FIG. 1 from another viewpoint.

The sample of material may be discharged by moving the carriage 10 transversely to the direction of flow of the material being sampled. In FIG. 2 this is illustrated by showing the main housing 10 moved substantially perpendicularly and laterally to rail 14 by means of rails 15 which are suspended from a portion of the carriage and moved with the carriage in the direction of flow of the material. A sub-carriage travels along rails 15 moving the main housing 10 from the sampling position shown in FIG. 2 by the solid lines to a discharge position shown by the dotted lines. As indicated hereinabove, the main housing 10 will normally be returned to a rest position or substantially horizontal position after a sample is extracted, then moved along rail 15 to be discharged into a sample receiving hopper 16. The open sampling end 10a of the main housing 10 is then lowered so that the screw 11 and barrel 12 are in a position to discharge the sample into sample receiving hopper 16. It is desirable, on occasion, to reverse the rotation of screw 11 to assist in the discharge of the sample contained within barrel 12.

Motor 17 drives the carriage along rails 14 to maintain the main housing 10 above the moving material to be sampled. Motor 18 and associated drive means moves the sub-carriage along rails 15 to place the main housing 10 in a discharge position.

The device illustrated in FIGS. 1 and 2 is particularly adapted for sampling rail cars of particular material such as coal and ores of various types. It is desirable, of course, to extract the sample without requiring a train of cars to stop so that each car may be sampled. Therefore, the sampling device is preferably adapted to move in a direction of flow of the material at substantially the same rate that the material is moving forward. Also, since it is desirable to have a sample which is substantially a core of material from the pile of particulate material it is desirable to have the sampling device extract a core of material without disturbing the surrounding material. This is accomplished by having the rotational speed of the screw and the linear speed of the barrel containing the screw move into the pile of material at a synchronized rate. That is, at a rate such that a particle of material within the screw has an upper linear velocity which matches the downward linear velocity of the barrel moving into the pile of material.

Although various means of supporting the main housing 10 are within the scope of the invention it is generally preferred that the main housing be suspended from a support means. The support means is preferably movable in at least one substantially horizontal direction and preferably movable in a direction of flow of the material to be sampled. The main housing 10 may be suspended from the support means so that the main housing moves transversely to the support means as described hereinafter.

FIG. 3 is a sectional, elevational view of main housing 10 illustrating the screw barrel 12 in a retracted position within the housing and in an extended position (dotted lines). The screw 11 moves with barrel 12 and maintains a fixed relative position with regard to barrel 12. The screw 11 may be a conventional conveying screw or auger having standard pitch although it is generally preferred that a smaller pitch than standard pitch be utilized because of the frequent steep angle with the horizontal which the screw assumes during the sampling operation. Standard pitch is equal to the diameter of the screw. A pitch of about one-half the diameter of the screw is frequently preferred for the purposes of this invention. For example, in a commercial application for sampling of coal in hopper cars it is preferred that the screw and barrel extend about 5 feet from the main housing 10. It is preferred for these purposes that the screw 11 and barrel 12 extend about 5 feet in about 2 seconds. Therefore, since it is desirable that the screw rotational speed is substantially matched by the linear extension speed of the barrel the screw should make two revolutions for each length of travel of the barrel equivalent to the diameter of the screw. This assumes a screw pitch equal to one-half the diameter of the screw.

Various screw diameters, pitches and linear extension speeds may be utilized. The above is given only by way of example for a screw intended for sampling coal in moving rail cars. The screw diameter may vary from a few inches up to 1 foot or more depending upon the size of the particles to be sampled and the size of the sample required. The screw and barrel extend from the main housing a distance dependent upon the kind of material to be sampled and the size of the sample required. Typical extension distances vary from about 2 feet to about 10 feet while a distance commercially acceptable for sampling coal in rail cars and the like is about 5 feet.

In FIG. 3 the screw barrel 12 is shown with a small opening 18 near the top thereof. This opening 18 is an overflow opening so that the sample material does not compact too tightly within the screw, causing the screw to bind within the barrel 12. A drive housing 19 is attached to the top end of barrel 12 and contains an electrical or hydraulic driven motor which turns the screw 11. The motor 20 may be connected to the screw through gear reduction means. The motor housing 19 travels within the elongated main housing 10 from the position shown in FIG. 3 to a position near the base of main housing 10 when the screw 11 and barrel 12 are fully extended.

The motor housing 19 is connected to a hydraulic or air cylinder 21 by a shaft contained within the expansible cover 22. The cover is utilized to prevent dirt and the like from getting into the air cylinder. The air cylinder 21 must be sufficiently powerful to force the barrel and screw into a pile of particulate material to be sampled. For example, for a barrel diameter of about 1 foot, a force of about 1,200 pounds is desired, that is, at an adjustable pressure of 50 to 100 psi. These figures are representative for coal. The force required will vary somewhat depending upon the material to be sampled and moisture content. The screw begins turning when the air cylinder 21 begins extending the screw and housing. The screw ceases to turn generally when the screw and barrel are fully extended. This function may be controlled by a limit switch, shutting the power off motor 20 whenever the motor 20 whenever the motor housing 19 reaches the base of main housing 10.

Also, shown in FIG. 3 is lug 23 attached to the main housing 10 by which the main housing 10 is supported. The lug is pivoted vertically about a support means attached to a carriage or other support. Also, shown in FIG. 3 is a stop 24 which is in contact with a bracket 25 attached to the vertical housing. The stop 24 determines the maximum angular position to which the main housing 10 may be rotated. Stop 24 and bracket 25 also assist in holding the main housing 10 in a rigid position while a sample is being extracted.

FIGS. 4, 5 and 6, illustrate various ways in which the main housing may be attached to a carriage or other support. These figures illustrate elevational views of the main housing. In FIG. 4 the main housing 10 is illustrated as being fixedly attached to a support 26. The main housing is disposed at an appropriate angle to the horizontal so that the barrel and screw could be placed in a proper relation to a pile of material for extracting a sample. Having the main housing 10 in a fixed position would rquire moving the pile of material into contact with the screw and housing 12. The screw and housing illustrated in FIG. 4 in a retracted position, could be extended into the pile of material for extracting a sample.

In FIG. 5 the main housing 10 is illustrated as being suspended by a swivel support 28 from a support means 29 and vertically pivoted about a pin 30 or other means so that the main housing 10 could be placed in an appropriate angle for sampling purposes and return to a substantially horizontal rest position as shown by the dotted lines.

In FIG. 6 the main housing 10 is shown as being suspended in the same angle at which it is placed for sampling purposes. The main housing could be raised and lowered by cables 31 or a pair of hydraulic cylinders. If cables are utilized to raise the main housing 10 it is preferred that it has some rigid attachment to the housing which keeps the housing in a rigid position while samples are being taken.

In FIGS. 7, 8, and 9 various means are illustrated wherein the housing moves transversely to its own longitudinal axis. It is generally preferred to move the housing transversely to its own longitudinal axis for the purpose of discharging samples to a receiving means located along side the material being sampled.

In FIG. 7 the main housing 10 is shown as being suspended by a single member 32 and moved transversely along a rail 33. In FIG. 8, the main housing is illustrated as being pivotally attached to a support 34 with the base or sampling end of the housing 10 free to be moved transversely, that is, the housing 10 is rotated about one end.

In FIG. 9 the main housing 10 is shown as being supported by a single member 35 which is attached to a substantially midpoint region of housing 10 and pivoted about a lug 36 attached to a fixed support 37. The main housing 10 is permitted to swing about support 36 and thus the whole housing 10 moves in an arc from a sampling position shown by the solid lines to a discharge position illustrated by the dotted lines.

Although the invention has been described hereinabove by reference to a specific embodiment it is to be understood that it is not to be limited thereto but to include all variations and modifications falling within the scope of the appended claims.

I claim:

1. An overhead, extensible sampling device for gathering samples from the surface portions of bulk, solid, particulate material comprising:
   a. an elongated outer housing selectively movable over said material and having an open sampling end positionable so that said open end is in close proximity to the solid, particulate material to be sampled;
   b. extensible sampling means enclosed within said outer housing comprising a tubular barrel of smaller diameter and substantially shorter than said outer housing, said barrel containing a fitted auger of substantially the same length as said barrel and rotatable therein, said barrel and auger being at least partially extensible as a unit beyond the open end of said outer housing, said barrel having an open collecting end through which the tip of said auger projects slightly;
   c. extending means attached to said tubular barrel to extend at least a portion of said barrel and auger beyond said open sampling end of said outer housing for forcing said open collecting end of said barrel and the tip of said auger into said solid, particulate material for extracting a sample therefrom;
   d. retracting means to retract said barrel and auger from an extended position to a retracted position substantially within said outer housing; and
   e. frame means for dependently supporting said outer housing.

2. The sampling device of claim 1 wherein the elongated outer housing is pivoted about a transverse axis remote from said open sampling end to facilitate positioning of said open sampling end in close proximity to the solid particulate material to be sampled.

3. The sampling device of claim 1 wherein the elongated outer housing is pivoted about pin means transverse to the longitudinal axis of said housing, said pin means located remotely from said open sampling end of said housing and supported by said subframe, said sub-frame carrying power means for lowering and raising said open sampling end in an arc about said pin means.

4. The sampling device of claim 1 wherein the extending means and the retraction means are combined in a single power means having a dual function.

5. The sampling device of claim 1 wherein said elongated outer housing contains a double-acting fluid cylinder and piston for extending and retracting said sampling means, said fluid cylinder being fixedly located with said housing so that said sampling means is between said fluid cylinder and said open sampling end.

6. The sampling device of claim 5 wherein said fluid cylinder provides at least 50 to about 100 psi pressure for each square inch of cross-section area of said sampling means which contacts the surface of said bulk, solid, particulate matter.

7. The sampling device of claim 1 wherein a drive housing is attached to said barrel opposite said open collecting end, said drive housing containing auger drive means for rotating said auger within said barrel, said drive housing being extensible and retractable within said elongated outer housing as part of said sampling means.

8. The sampling device of claim 7 wherein said auger drive means is reversible, rotating said auger in one direction to gather samples and rotating in an opposite direction to discharge said samples.

9. The sampling device of claim 8 wherein the rotational speed of said auger drive means is correlated to the linear speed extension of said barrel to provide the same linear speed for a particle within said barrel as the linear extension speed of said barrel.

10. The sampling deivce of claim 7 wherein said auger drive means is a fluid activated motor.

11. The sampling device of claim 1 wherein the auger has a minimum diameter of about 2 inches and a maximum diameter of about 12 inches.

12. The sampling device of claim 1 wherein said elongated outer housing contains guide means near its open sampling end for guiding said barrel during extension and retraction.

13. An overhead, extensible sampling device for gathering samples from the surface portions of bulk, solid, particulate material comprising:
   a. an elongated outer housing selectively movable over said material and having an open sampling end positionable so that said open end is in close proximity to the solid, particulate material to be sampled;
   b. extensible sampling means enclosed within said outer housing comprising means for gathering and retaining solid, particulate material.
   c. extending means attached to said sampling means to extend at least a portion of said sampling means beyond said open sampling end of said outer housing for forcing an end of said sampling means into said solid, particulate material;
   d. retraction means to retract said sampling means from its extended position and return said sampling means to its retracted position;
   e. support frame means for dependently supporting said outer housing,
   f. a moveable sub-frame interposes between said support frame and said elongated outer housing to which said housing is attached, said sub-frame adapted to move horizontally along said support frame and to transport said elongated outer housing during said movement;
   g. sub-frame drive means to move said sub-frame in at least one horizontal direction along said support frame.

14. The sampling device of claim 13 wherein said sub-frame is moveable in at least two horizontal directions, one direction being parallel to the longitudinal axis of said elongated outer housing and the other direction being transverse to said first direction.

* * * * *